(No Model.)
G. E. BROOKS.
SPOOL HOLDER.
No. 339,738. Patented Apr. 13, 1886.
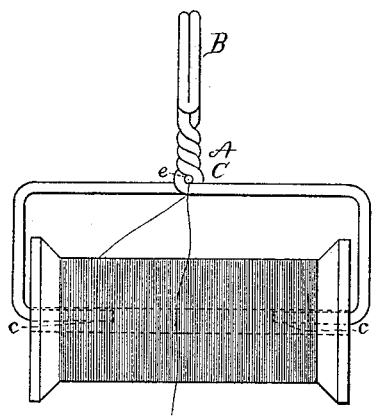
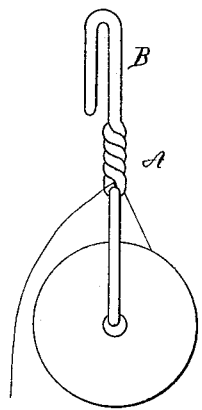
Witnesses.
J. Edward Ludington
W. C. Warren.
Inventor.
George E. Brooks
per George Terry
Atty

UNITED STATES PATENT OFFICE.

GEORGE E. BROOKS, OF NEW HAVEN, CONNECTICUT.

SPOOL-HOLDER.

SPECIFICATION forming part of Letters Patent No. 339,738, dated April 13, 1886.

Application filed November 19, 1884. Serial No. 148,354. (No model.)

*To all whom it may concern:*

Be it known that I, GEORGE E. BROOKS, a citizen of the United States, residing at New Haven, in the county of New Haven and State of Connecticut, have invented certain new and useful Improvements in Devices for Attaching Spools to the Dress of Persons, of which the following is a specification, reference being had therein to the accompanying drawings, in which—

Figure 1 is a side elevation of my improved device, and Fig. 2 is an end view of the same. Fig. 3 shows a clamping contrivance which may be used to attach the device to the dress, instead of the hook shown in the other figures.

My invention relates to a device for attaching spools to the dress of persons; and it consists in forming the device of a single piece of wire, as is hereinafter more fully set forth.

The invention consists in providing the attaching device with a twisted shank having an eye for the passage of the thread from the spool made at the junction of said shank with the spool-frame.

To enable others to make and use my device, I will give a detailed description of the same.

A wire of suitable length is bent in the middle until the parts are parallel and close together. The doubled end is bent in the form of a hook, as shown in Fig. 2. Immediately below the hook the doubled wire is twisted together and forms the shank A, the lower turns being left open to leave the open space or hole $e$. The wires are then formed into the rectangular frame C, the ends extending a short distance into the spool. The wires above the shank A may be made in the form shown in Fig. 3 as a spring-clamp, and a fold of the dress passed through the space $a$ and slipped between the parts $b$ will hold the device firmly to the dress. The elasticity of the frame, and the short distance which the ends of the wires $c$ extend into the spool, will allow the spool to be changed at pleasure. By means of the open space $e$ the thread takes an upward direction as it is unwound from the spool, and the liability of the thread to work off the ends of the spool onto the wires is diminished.

Having described my improved device, what I claim as new, and desire to secure by Letters Patent, is—

1. The improved spool-holder herein described, made from a single piece of wire, consisting of the frame C, provided with an attaching device at one side thereof, made from a folded portion of said wire, having a twisted shank, with a thread-eye, $e$, formed in said twisted shank at its junction with the frame, substantially as shown and described.

2. A spool-holder made from a single piece of wire, comprising the frame C, the improved attaching-loop having converging spring sides adapted to clamp the material of the garment, and a shank for said attaching-loop, formed from doubled twisted wire, and with a thread-eye, $e$, at the junction of said twisted shank with the frame, substantially as shown and described.

In testimony whereof I affix my signature in presence of two witnesses.

GEORGE E. BROOKS.

Witnesses:
GEORGE TERRY,
J. EDWARD LUDINGTON.